(12) United States Patent
Hedman

(10) Patent No.: US 10,344,827 B2
(45) Date of Patent: Jul. 9, 2019

(54) DUAL CLUTCH TRANSMISSION

(75) Inventor: Anders Hedman, Marstrand (SE)

(73) Assignee: Volvo Lastvagnar AB, Göteborg (SE)

(*) Notice: Subject to any disclaimer, the term of this patent is extended or adjusted under 35 U.S.C. 154(b) by 620 days.

(21) Appl. No.: 14/401,642

(22) PCT Filed: Jun. 25, 2012

(86) PCT No.: PCT/EP2012/002668
§ 371 (c)(1),
(2), (4) Date: Nov. 17, 2014

(87) PCT Pub. No.: WO2014/000752
PCT Pub. Date: Jan. 3, 2014

(65) Prior Publication Data
US 2015/0128736 A1    May 14, 2015

(51) Int. Cl.
*F16H 3/091* (2006.01)
*F16H 3/00* (2006.01)
*F16H 3/08* (2006.01)

(52) U.S. Cl.
CPC ........... *F16H 3/0915* (2013.01); *F16H 3/006* (2013.01); *F16H 3/091* (2013.01); *F16H 2003/0807* (2013.01); *Y10T 74/19228* (2015.01)

(58) Field of Classification Search
CPC ........ F16H 3/0915; F16H 3/091; F16H 3/001; F16H 2003/0807; F16H 3/006; F16H 1/10; Y10T 74/19228
USPC ............................ 74/321, 330, 333, 352, 410
See application file for complete search history.

(56) References Cited

U.S. PATENT DOCUMENTS

| 5,181,431 A * | 1/1993 | Zaiser | F16H 3/006 |
| | | | 192/48.609 |
| 6,347,572 B1 * | 2/2002 | Martin | F03C 1/045 |
| | | | 91/473 |
| 6,354,417 B1 * | 3/2002 | Narita | F16D 11/10 |
| | | | 192/108 |
| 6,994,651 B2 * | 2/2006 | Fox | F16C 33/605 |
| | | | 475/335 |

(Continued)

FOREIGN PATENT DOCUMENTS

| DE | 102 52 152 A1 | 5/2004 |
| DE | 10 2007 040449 A1 | 3/2009 |
| WO | 20110069530 A1 | 6/2011 |

OTHER PUBLICATIONS

International Search Report (dated Oct. 9, 2012) for corresponding International Application PCT/EP2012/002668.

(Continued)

*Primary Examiner* — William Kelleher
*Assistant Examiner* — Joseph Brown
(74) *Attorney, Agent, or Firm* — WRB-IP LLP

(57) ABSTRACT

A dual clutch transmission includes a first and a second input shaft provided with a first and second input arrangement, respectively, a center shaft, a countershaft, and a first and a second primary gear step. The first and second input shaft are coaxially arranged with the center shaft and can transfer torque from the first and second input means to the countershaft via the first and the second primary gear step. The first primary gear step including a first input gearwheel and a first driven gearwheel. The first input gearwheel is rotationally fixed with the first input shaft. The first input gearwheel is arranged upon the center shaft.

10 Claims, 4 Drawing Sheets

(56) References Cited

U.S. PATENT DOCUMENTS

| | | | | |
|---|---|---|---|---|
| 7,121,395 B2* | 10/2006 | Ore | ............ | F16H 63/04 |
| | | | | 192/69.9 |
| 7,181,989 B2* | 2/2007 | Obinata | ............ | F16H 3/093 |
| | | | | 74/330 |
| 7,210,367 B2* | 5/2007 | Akutagawa | ............ | F16H 3/006 |
| | | | | 74/331 |
| 7,267,022 B2* | 9/2007 | Gumpoltsberger | ..... | F16H 3/006 |
| | | | | 384/461 |
| 7,437,964 B2* | 10/2008 | Gitt | ............ | F16H 3/006 |
| | | | | 74/330 |
| 7,621,839 B2* | 11/2009 | Jackson | ............ | F16H 3/006 |
| | | | | 475/214 |
| 7,775,134 B2* | 8/2010 | Lim | ............ | B60K 17/34 |
| | | | | 74/15.2 |
| 7,845,246 B2* | 12/2010 | Tsukada | ............ | F16H 3/006 |
| | | | | 74/330 |
| 8,555,740 B2* | 10/2013 | Tanaka | ............ | F16D 11/10 |
| | | | | 74/342 |
| 8,597,148 B2* | 12/2013 | Ziemer | ............ | F16D 25/061 |
| | | | | 475/61 |
| 2007/0144861 A1* | 6/2007 | Yamasaki | ............ | F16D 13/54 |
| | | | | 192/70.23 |
| 2010/0150488 A1* | 6/2010 | Beck | ............ | F16C 19/54 |
| | | | | 384/537 |

OTHER PUBLICATIONS

International Preliminary Report on Patentability (dated Jul. 16, 2014) for corresponding International Application PCT/EP2012/002668.

* cited by examiner

FIG. 1 [Prior art]

DUAL CLUTCH TRANSMISSION

BACKGROUND AND SUMMARY

The present invention relates to the arrangement of gearwheels in a dual clutch transmission, especially a dual clutch transmission for on-road vehicles.

In a dual clutch transmission with coaxial input and output shafts, a small main pilot bearing is arranged between the centre shaft and the first input shaft. The pilot bearing is subjected to large axial forces in some gear speeds. The large axial forces originate from the helical gears, which when transferring torque are subjected to a gear mesh force. These large axial forces are a problem especially in gear speeds when there will be no relative rotation in the main pilot bearing. Large axial forces and no relative rotation are very unfavourable operating conditions for a small bearing. Fretting wear may occur, which will lead to premature damage of the bearing.

U.S. Pat. No. 5,181,431 discloses example of prior art.

A solution o the problem would be to increase the size of the bearing. There is however no room available for a larger bearing.

It is desirable to provide an inventive gear arrangement in a dual-clutch transmission, said gear arrangement aims to decrease the load upon the pilot bearing in situations where there is no relative rotation in the bearing.

According to an aspect of the invention, a dual clutch transmission comprises a first and a second input shaft provided with a first and second input means respectively, a centre shaft, a countershaft and a first and a second primary gear step. The first and second input means are normally a first and a second clutch. The first and second input shafts are coaxially arranged with the centre shaft and can transfer torque from said first and second input means to said countershaft via said first and said second primary gear step. This is a well known configuration, used in several dual clutch transmissions.

The first primary gear step comprises a first input gearwheel and a first driven gearwheel, wherein said first input gearwheel is rotationally fixed with said first input shaft. According to the invention, the first input gearwheel is arranged upon said centre shaft, instead of upon the first input shaft as previously known.

By arranging the first input gearwheel upon the centre shaft instead of the first input shaft, as previously known, axial gear mesh forces that act on the first primary gearwheel will be taken up and carried by the main shaft, whereby the pilot bearing is subjected to less axial load.

It is preferred that the first input shaft is connected to the first input gearwheel through a connection allowing an axial play, whereby the connection not is able to transfer any axial load. The connection comprises a first part belonging to the input shaft and a second part belonging to the centre shaft. One such preferred connection is a spline coupling. A spline coupling could be integrated, whereby it comprises mating clutch teeth on the first input shaft and first primary cut gearwheel 332. The spline coupling could alternatively comprise a bridging element that mates with clutch teeth on the first input shaft and the first primary cut gearwheel. However, the connection is always engaged. An alternative coupling could be axially directed dog clutch teeth.

It is further preferred that said first input shaft arranging said first input gearwheel upon conical roller bearings, which can be subjected to relatively high axial loads.

Alternatively, the first input gearwheel is arranged upon cylindrical roller bearings, which could be preferred in a cost perspective relative conical roller bearings.

It is further advantageous that said first input gearwheel is arranged upon said centre shaft such, that it can be axially displaced between a distanced axial position and a contact axial position upon the centre shaft, but always rotationally fixed to said first input shaft. In the distanced axial position, the first input gearwheel is axially distanced from the first part of said connection and in the contact axial position, an axial contact between the first input gearwheel and the first part of said connection is enabled. In the contact position, axial forces acting upon the input gear wheel can thereby be transferred to the first input shaft, whereby the pilot bearing is further relived from axial load.

It is foreseen that the first input gearwheel is displaced into said contact axial position when it transfers a torque load in a first direction. The axial displacement is due to gear mesh forces acting upon the first input gearwheel.

The first input gearwheel and the first driven gearwheel are provided with helical gear teeth, whereby an axial displacement of the first input gearwheel, from said distanced axial position to the contact axial position, is actuated when the first input gearwheel transfers a torque load to the driven gearwheel.

To achieve the axial sliding of the first input gearwheel it is mounted such upon a first and a second roller bearing that it can slide thereupon. The first input gearwheel is thereby provided with a radially inwards directed protrusion, which is arranged such between said first and second roller bearing that said axial displacement is allowed. The radially inwards directed protrusion thereby has an axial extension which is shorter than the corresponding distance between the first and the second roller bearing.

In a further embodiment of the invention the first input gearwheel is provided with a synchronisation mechanism or a dog clutch enabling a rotational connection between said first input gearwheel and said centre shaft. By closing the synchronisation mechanism or the dog clutch a direct connection between the first input shaft and the centre shaft is achieved.

BRIEF DESCRIPTION OF THE DRAWINGS

The present invention will now be described in detail with reference to the figures, wherein.

DETAILED DESCRIPTION

Figure 1:
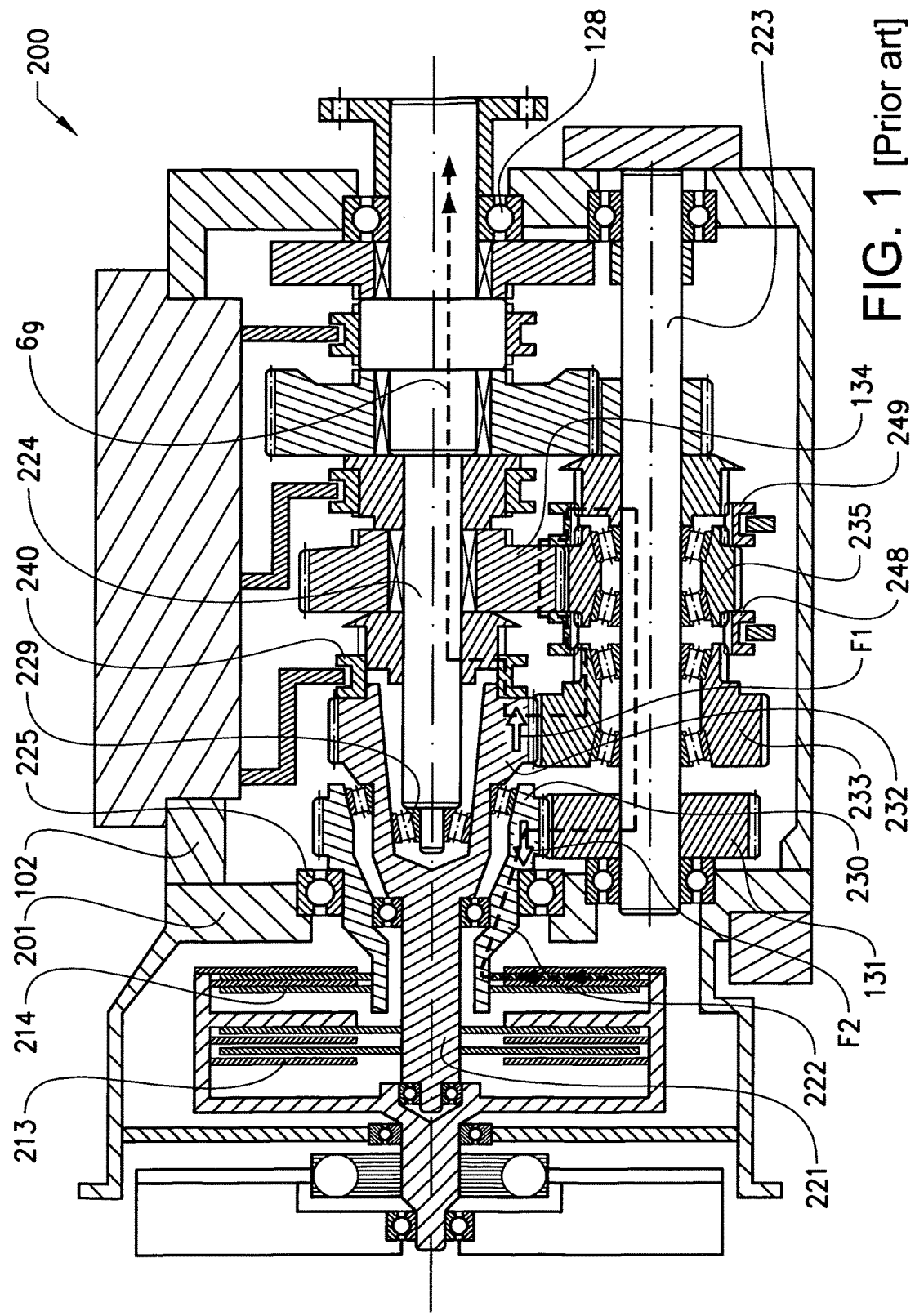
FIG. 1 shows a dual clutch transmission according to the prior art.

FIG. 1 shows a prior art dual clutch transmission 200, when it is in engine drive. The dual clutch transmission 200 is arranged inside the main housing 102, there are a first input shaft 221 and a second input shaft 222. The first input shaft 221 can be rotationally driver by the first clutch disc set 213, and the second input shaft 222 can be rotationally driven by the second clutch disc set 214.

According to the prior aft first primary gear teeth 232 are rotationally fixed to or integral with the first input shaft 221 and second primary gear teeth 230 are rotationally fixed to or integral with the second input shaft 222. A centre shaft 224 is coaxial with the input shafts 221 and 222 and a countershaft 223 is parallel thereto. The second input shaft 222 is suspended in the clutch housing 201 by an input shaft bearing 225. Between the centre shaft 224 and the first input shaft 221 a main pilot bearing 229 is arranged. An adequate suspension of the centre and input shafts is achieved with two bearings between the input shafts 221 and 222.

On the countershaft 223, the second primary gearwheel 131 meshes with the second primary gear teeth 230 of the second input shaft 222. A primary countershaft loose gearwheel 233 meshes with the first primary gear teeth 232 of the first input shaft 221. A secondary countershaft loose gearwheel 235 meshes with the second secondary loose gearwheel 134 on the main shaft 224.

In FIG. 1 the transmission 200 is shown with the top sixth gear active (dashed line 6g) and the fifth, direct, gear inactive. The primary countershaft loose gearwheel 233 is rotationally connected to the countershaft 223 by a first countershaft tooth clutch 248, secondary countershaft loose gearwheel 235, and second countershaft tooth clutch 249. In addition, the direct tooth clutch 240 rotationally connects the first input shaft 221 and centre shaft 224. In FIG. 1 the second clutch disc set 214 is engaged. Power can thereby be transferred to the centre shaft 224 via the second input shaft 222, second primary gear teeth 230, second primary gearwheel 131, countershaft 223, second countershaft tooth clutch 249, secondary countershaft loose gearwheel 235, first countershaft tooth clutch 248, primary countershaft loose gearwheel 233, first primary gear teeth 232, first input shaft 221, and direct tooth clutch 240, The arrows F1, F2 show the axial gear mesh forces that act on the first primary gear teeth 232 and the second primary gear teeth 230, respectively, when the engine is driving the vehicle. It can be concluded that the first input shaft 221 will be pushed to the right. Thereby, the small main pilot bearing 229 will be subjected to large forces. Since the direct tooth clutch 240 is engaged, there will be no relative rotation in the main pilot bearing 229. Large axial forces and no relative rotation are very unfavourable operating, conditions for a small bearing. Fretting wear may occur, which will lead to premature damage of the bearing.

Now, in the following embodiments of the invention are shown and described in conjunction with FIG. 2 and FIGS. 3a and b, simply by way of illustration of some modes of carrying out the invention.

Figure 2:
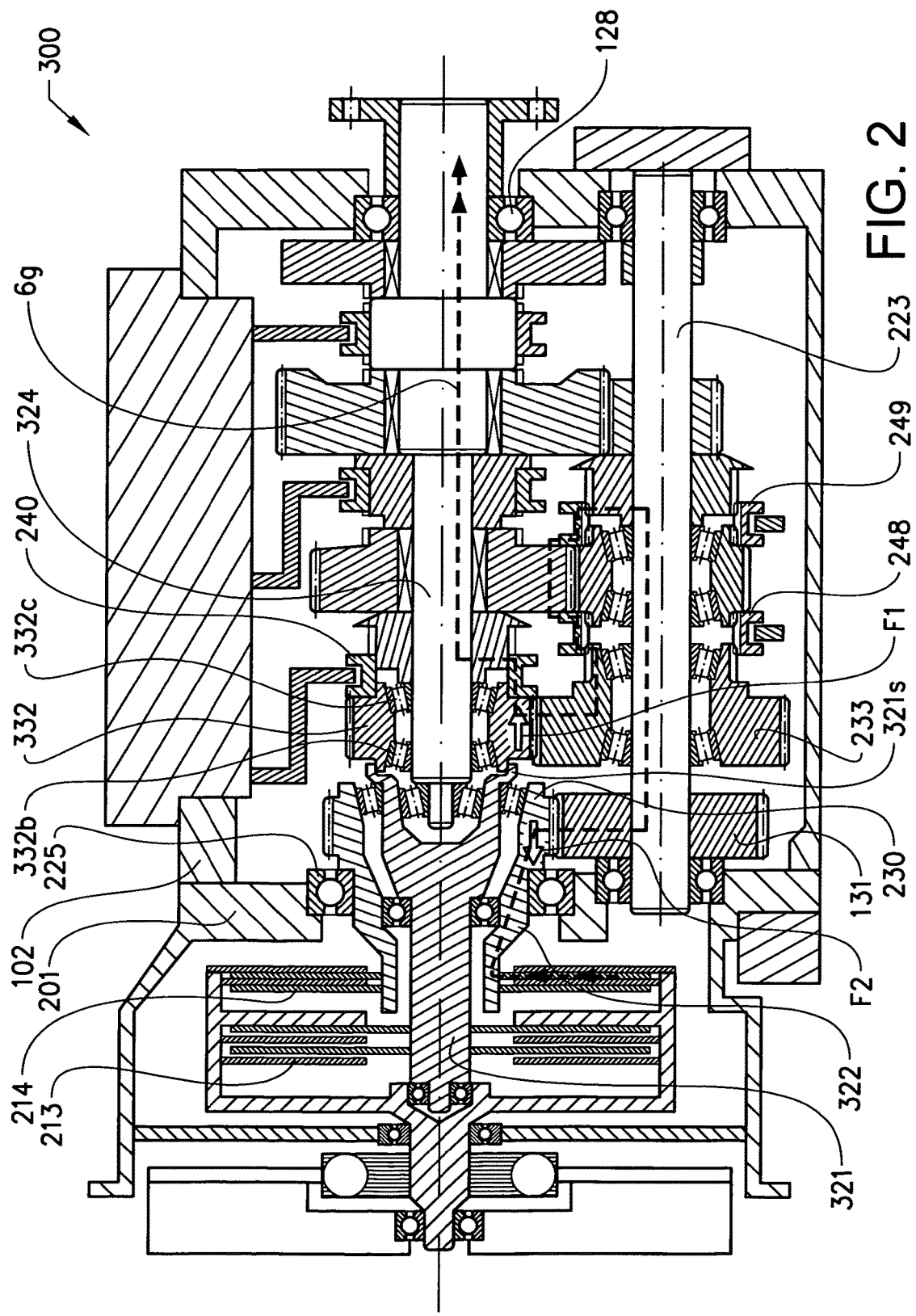
FIG. 2 shows a first embodiment of the inventive dual clutch transmission.

FIG. 2 shows a first embodiment of the inventive dual clutch transmission 300 in engine drive. The dual clutch transmission 300 comprises a first and a second input shaft 32 322 a centre shall 324 and a countershaft 223.

The inventive dual clutch transmission 300 corresponds to the prior art transmission 200 disclosed in FIG. 1. However, the first input shaft 321 is inventively not provided with any gear teeth, instead a first primary cut gearwheel 332 is provided on bearings 332b, 322c and carried by the main shaft 324. Further, the first primary cut gearwheel 332 is connected rotationally to the first input shaft 321 by a first primary spline coupling 321s, whereby an axial play is allowed in the spline coupling 321s. Axial gear mesh forces (arrow F1) that act on the first primary cut gearwheel 332 will be carried by the main shaft 324 instead of the main pilot bearing 229. Axial gear mesh forces (arrow F2) that act on the second primary cut gearwheel 230 will be taken up by the bearing 225.

In FIG. 2 the transmission 300 is shown operating with the sixth gear active (6g), whereby the dog clutch 240 is closed and there is no relative rotation in the main pilot bearing 229. For the case of engine driving the vehicle, arrows F1, F2 indicate the directions of the axial gear mesh forces F1, F2 that act on the first primary cut gearwheel 332 and second primary gear teeth 230, respectively. As can be seen, the main pilot bearing 229 is not subjected to axial gear mesh forces. Thereby, the risk of having fretting, wear damages is greatly reduced.

The first primary cut gearwheel 332 is rotationally connected to the main shaft 324 through the dog clutch 240, whereby, the bearings 332b, 332c will not be subjected to relative rotation. The bearings 332b 332c will carry the load from the gear mesh force F1, but they are considerably larger than the main pilot bearing 129, whereby problems with fretting wear can be avoided. Hence, by separating the first primary cut gearwheel 332 from the first input shaft 321 and arranging it on the main shaft 324, the risk for fretting wear damages can be avoided for the main pilot bearing 229.

The first primary spline coupling 321s provides a constant rotational connection between the first input shaft 321 and the first primary cut gearwheel 332. The spline coupling 321s allows an axial play between the first primary cut gearwheel 332 and the first input shaft 321. Axial forces can thereby not be transferred from the centre shaft 324 to the first input shaft 321 or vice versa.

In conclusion, the dual clutch transmission 300 enables the use of the rear primary gear stage 233, 332 as a secondary gear stage, i.e., transfer power from the countershaft to the main shaft, and that without having the main pilot bearing 229 subjected to fretting wear.

The most common way to suspend gearwheels that are simultaneously subjected to load and relative rotation is tapered roller bearings arranged opposed each other. Axial forces can be transferred in both directions between gearwheel and shaft. In FIG. 2 the arrows F1, F2 indicate axial gear mesh forces that act on the second primary gear teeth 230 and first primary cut gearwheel 332 when the engine is driving the vehicle. For opposite power flow, engine braking, the axial force directions will be reversed, whereby the main pilot bearing 229 could be subjected to large axial forces while still having no relative rotation therein. This poses a risk for fretting wear, but could be acceptable, since the engine braking torque is usually significantly smaller than the maximum driving torque, and engine braking is considerably less frequent than engine driving.

However, a direct transfer of axial force from the first primary cut gearwheel 332 to the first input shaft 321 would be of advantage. Then, the main pilot bearing 229 could be relieved from axial gear mesh forces.

Figure 3A:
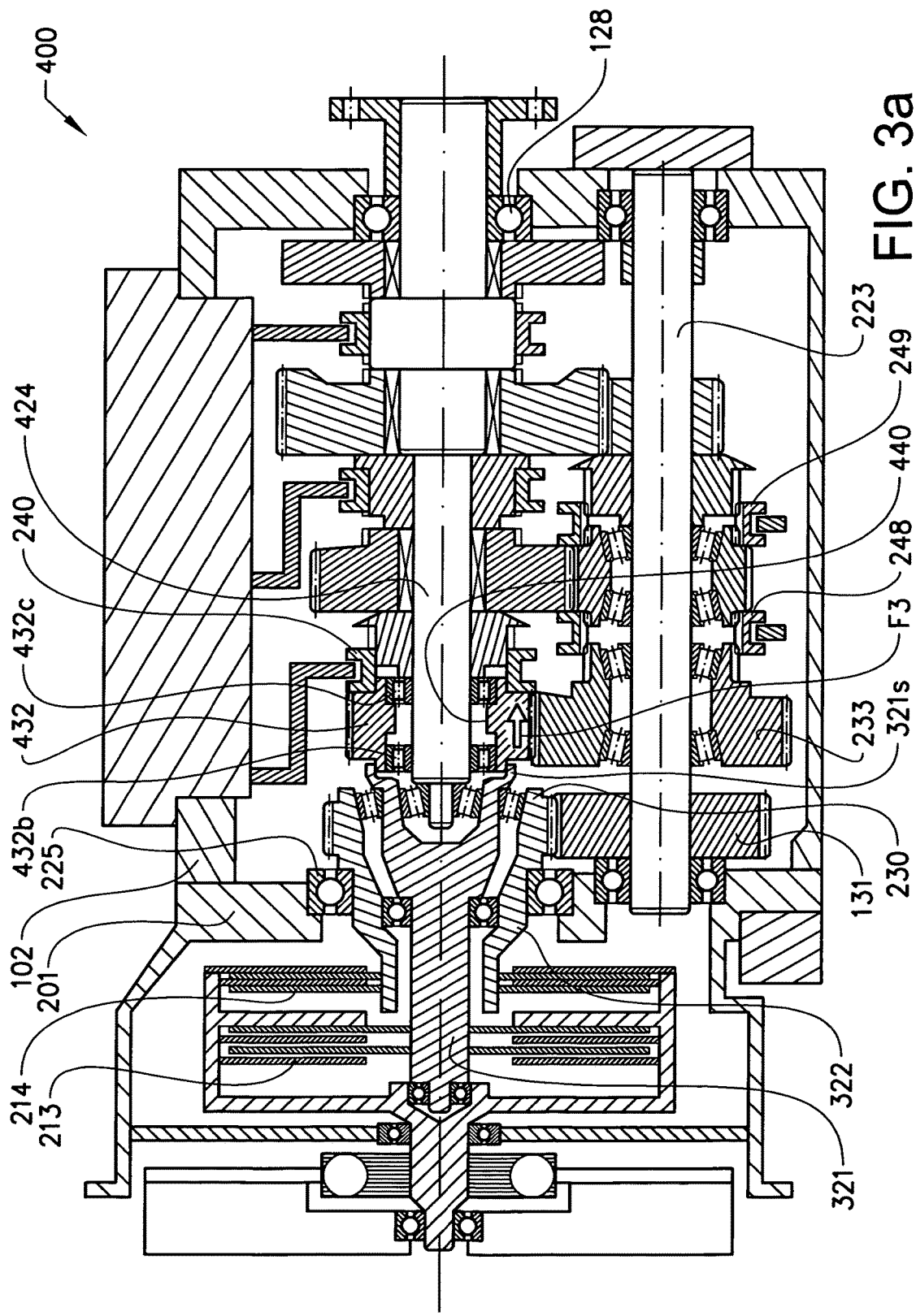
FIGS. 3a, b shows a second embodiment of the inventive dual clutch transmission.

In FIGS. 3a and b an alternative embodiment of the inventive transmission is shown, in which said risk for fretting wear at engine braking is reduced. A modified dual clutch transmission 400 comprises an inventive first primary cut gearwheel 432 that is carried on the centre shaft 424 by cylindrical roller bearings 432b, c.

Cylindrical roller bearings may allow some relative axial displacement. However, in a carefully designed cylindrical bearing arrangement, the axial force transfer can be controlled. In the dual clutch transmission 400, this is done in the following way: The first primary cut gearwheel 432 has an inwardly directed protrusion 440 between the cylindrical roller bearings 432b, 432c. When the first primary cut gearwheel 432 is subjected to axial gear mesh forces directed to the right, as indicated by the arrow F3 in FIG. 3a, the inwardly directed protrusion 440 will come in contact with the right cylindrical roller bearings 432c. The axial gear mesh forces will then be transferred to the main shaft 424 and taken up by the bearing 128 between the centre shaft 424 and the housing 102. This corresponds to the case of the engine driving the vehicle, in analogy with FIGS. 1 and 2.

Figure 3B:
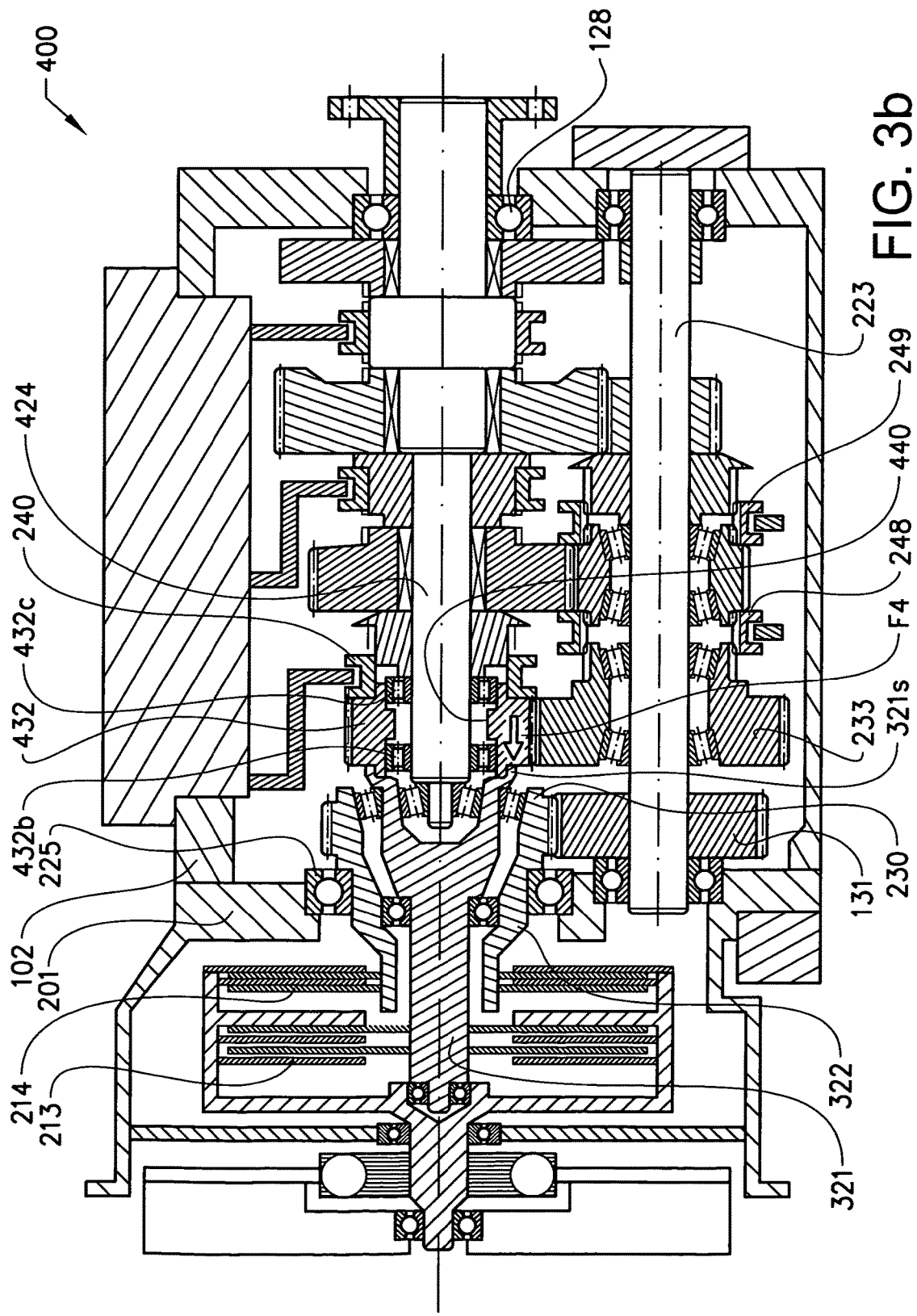

At engine braking, an arrow F4 in FIG. 3b shows the direction of the axial gear mesh force on the first primary cut gearwheel 432. The gear mesh force will push the first primary cut gearwheel 432 to the left. The inwardly directed protrusion 440 is designed in such a way that it will not come in contact with the left of the cylindrical roller bearings 432b. Instead, the first primary cut gearwheel 432 will come in axial contact with the first input shaft 321, to which the axial gear mesh forces will be transferred directly. Thereby, the main pilot bearing 229 will be relieved from axial gear mesh forces also during engine braking.

In the embodiments shown in FIGS. 2, 3a and 3b the spline coupling 321s comprises mating clutch teeth on the first input shaft 321 and first primary cut gearwheel 332, 432. This is illustrated schematically in FIGS. 2, 3a and 3b.

Alternatively, the spline coupling 321s comprises a bridging element (not shown) that mates with clutch teeth on the first input shaft 321 and the first primary cut gearwheel 332/432.

Reference signs mentioned in the claims should not be seen as limiting the extent of the matter protected by the claims, and their sole function is to make claims easier to understand.

As will be realised, the invention is capable of modification in various obvious respects, all without departing from the scope of the appended claims. Accordingly, the drawings and the description thereto are to be regarded as illustrative in nature, and not restrictive.

The invention claimed is:

1. A dual clutch transmission comprising;
a first and a second input shaft provided with a first and second input means respectively,
a centre shaft,
a countershaft, and
a first and a second primary gear step, wherein the first and second input shaft are coaxial arranged with the centre shaft and can transfer torque from the first and second input means to the countershaft via the first and the second primary gear step, the first primary gear step comprises a first input gearwheel and a first driven gearwheel, wherein the first input gearwheel is rotationally fixed with the first input shaft and the first input gearwheel is arranged upon the centre shaft, wherein the first input gearwheel is connected to the first input shaft through a connection allowing an axial play, whereby the connection is a spline coupling.

2. The dual clutch transmission according to claim 1, wherein the first input gearwheel is arranged upon conical roller bearings.

3. The dual clutch transmission according to claim 1, wherein the first input gearwheel is arranged upon cylindrical roller bearings.

4. The dual clutch transmission according to claim 3, wherein the first input gearwheel is arranged upon the centre shaft such, that it can be axially displaced between a distanced axial position and a contact axial position upon the centre shaft and whereby in the distanced axial position, the first input gearwheel is axially distanced from the connection and in the contact axial position, an axial contact between the first input gearwheel and the connection is enabled.

5. The dual clutch transmission according to claim 4, wherein the first input gearwheel is displaced into the contact axial position when it transfers a torque load in a first direction.

6. The dual clutch transmission according to claim 4, wherein the first input gearwheel and the first driven gearwheel are provided with helical gear teeth.

7. The dual clutch transmission according to claim 4, wherein the first input gearwheel is mounted upon a first and a second roller bearing, such that it can slide thereupon, and is provided with a radial inwardly directed protrusion arranged between the first and second roller bearing, such that the axial displacement is allowed.

8. The dual clutch transmission according to claim 4, wherein the first input gearwheel is provided with a synchronisation mechanism or a dog clutch enabling a rotational connection between the first input gearwheel and the centre shall.

9. The dual clutch transmission according to claim 1, comprising a main pilot bearing between the first input shaft and the centre shall, axial movement of the first input gearwheel preventing force transmission between the first input shaft and the centre shaft through the main pilot bearing.

10. The dual clutch transmission according to claim 9, wherein the main pilot bearing is a conical roller bearing.

* * * * *